(12) United States Patent
Kitajima

(10) Patent No.: US 7,165,736 B2
(45) Date of Patent: Jan. 23, 2007

(54) REAR DRAG OPERATION STRUCTURE FOR A SPINNING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 38 days.

(21) Appl. No.: 10/885,448

(22) Filed: Jul. 7, 2004

(65) Prior Publication Data

US 2005/0023393 A1 Feb. 3, 2005

(30) Foreign Application Priority Data

Jul. 30, 2003 (JP) ............................. 2003-282562

(51) Int. Cl.
*A01K 89/02* (2006.01)

(52) U.S. Cl. .................................................. 242/245

(58) Field of Classification Search ................ 242/245, 242/246

See application file for complete search history.

(56) References Cited

U.S. PATENT DOCUMENTS

| | | | | |
|---|---|---|---|---|
| 4,591,108 A | * | 5/1986 | Ban ............................. | 242/245 |
| 4,598,879 A | * | 7/1986 | Fujigiwa et al. ............. | 242/245 |
| 4,725,012 A | * | 2/1988 | Councilman .................. | 242/245 |
| 4,749,285 A | * | 6/1988 | Noda ........................... | 242/244 |
| 4,988,057 A | * | 1/1991 | Hitomi ......................... | 242/245 |
| 5,201,477 A | * | 4/1993 | Kawabe ........................ | 242/245 |
| 5,289,991 A | * | 3/1994 | Sugawara .................... | 242/245 |

FOREIGN PATENT DOCUMENTS

JP 3-5259 Y 2/1991

* cited by examiner

*Primary Examiner*—Kathy Matecki
*Assistant Examiner*—Evan H. Langdon
(74) *Attorney, Agent, or Firm*—Global IP Counselors, LLP

(57) ABSTRACT

The rear drag operation structure includes a knob mounting portion, a first rear drag knob, and a second rear drag knob. The knob mounting portion includes a tubular portion that projects rearward from the rear portion of the reel unit, and a male threaded portion formed on the outer peripheral surface of the tubular portion. The first rear drag knob is mounted on the rear end portion of the knob mounting portion. The second rear drag knob includes lever members that are disposed between the rear portion of the reel unit and the front portion of the first rear drag knob, and a nut member that is mounted on the lever members so as to be not rotatable but moveable forward and backward relative thereto, and is screwed onto the male threaded portion of the knob mounting portion.

14 Claims, 11 Drawing Sheets

REAR DRAG OPERATION STRUCTURE FOR A SPINNING REEL

BACKGROUND OF THE INVENTION

1. Field of the Invention

The present invention generally relates to a rear drag operation structure. More specifically, the present invention relates to a rear drag operation structure that serves to operate a rear drag mechanism that is arranged on the rear of a reel unit of a spinning reel.

2. Background Information

With conventional spinning reels, a rear drag operation structure that serves to operate a rear drag mechanism arranged on the rear of a reel unit has been widely adopted.

A conventional rear drag operation structure includes a knob mounting portion, a first rear drag knob, and a second rear drag knob (see, for example, Japanese Utility Model Publication 3-5259. FIG. 1). The knob mounting portion includes a tubular portion and a male threaded portion. The tubular portion has a tubular shape that projects rearward from the rear portion of the reel unit, and the male threaded portion is formed on an outer peripheral surface of the tubular portion. The first rear drag knob serves to finely adjust the drag force of the rear drag mechanism, and is mounted on the rear end portion of the knob mounting portion. The second rear drag knob includes a lever member and a nut member. The lever member is disposed between the rear portion of the reel unit and the front portion of the first rear drag knob. The nut member is mounted on the lever member so that the nut member is non-rotatable therewith and non-movable forward and backward relative thereto. In addition, the nut member is screwed onto the male threaded portion of the knob mounting portion. When the lever member of the second rear drag knob described above is pivoted, the nut member will rotate together with the lever member relative to the knob mounting portion. When this occurs, the lever member and the nut member will move forward and backward relative to the knob mounting portion, and the drag force of the rear drag mechanism will be adjusted. By operating the second rear drag knob, it is possible to effect a drag force adjustment quickly.

With a rear drag operation structure for a conventional spinning reel, when the lever member of the second rear drag knob is pivoted, the drag force of the rear drag mechanism is adjusted by moving the lever member and the nut member forward and backward relative to the knob mounting portion. When this occurs, it will be necessary to provide a gap between the second rear drag knob and the rear portion of the real unit and a gap between the second rear drag knob and the front portion of the first rear drag knob, so that the lever member does not come in contact with the rear portion of the reel unit or the front portion of the first rear drag knob. The larger these gaps become, the more likely foreign materials such as dirt and dust enter into the reel unit from the gaps, and an uneven surface from the rear portion of the reel unit to the first rear drag knob is produced in the contour of the rear drag operation structure and thus the design becomes less desirable.

In view of the above, it will be apparent to those skilled in the art from this disclosure that there exists a need for an improved rear drag operation structure that overcomes the problems of the conventional art. This invention addresses this need in the art as well as other needs, which will become apparent to those skilled in the art from this disclosure.

SUMMARY OF THE INVENTION

In a rear drag operation structure for a spinning reel, it is an object of the present invention to make it difficult for foreign matter to enter inside the reel unit, and to improve the design of the rear drag operation structure.

A rear drag operation structure for a spinning reel according to a first aspect of the present invention serves to operate a rear drag mechanism arranged on the rear of a reel unit, and includes a knob mounting portion, a first rear drag knob, and a second rear drag knob. The knob mounting portion includes a tubular portion and a male threaded portion. The tubular portion is adapted to be arranged on a rear of the reel unit so as to project rearward in a tubular shape from the rear portion of the reel unit. The male threaded portion is formed on an outer peripheral surface of the tubular portion. The first rear drag knob serves to adjust the drag force of the rear drag mechanism finely, and is mounted on the rear end portion of the knob mounting portion. The second rear drag knob serves to adjust the drag force of the rear drag mechanism, and includes a lever member and a nut member. The lever member is adapted to be disposed between the rear portion of the reel unit and the front portion of the first rear drag knob. The lever member can be brought into contact with the rear portion of the reel unit and the front portion of the first rear drag knob. The nut member is mounted on the lever member so that the nut member is non-rotatable relative thereto but movable forward and backward relative thereto. In addition, the nut member is screwed onto the male threaded portion of the knob mounting portion.

With this rear drag operation structure for a spinning reel, when the lever member of the second rear drag knob is pivoted, the nut member will rotate together with the lever member relative to the knob mounting portion. At this point, when the lever member comes into contact with the front portion of the first rear drag knob and the rear portion of the reel unit, the nut member will move forward and backward relative to the lever member and the knob mounting portion, and the drag force of the rear drag mechanism will be adjusted. By operating the second rear drag knob, it is possible to effect a drag force adjustment quickly.

Here, by contacting the lever member with the front portion of the first rear drag knob and the rear portion of the reel unit, the relative movement of the lever member forward and backward with respect to the knob mounting portion is restricted. In this state, the drag force of the rear drag mechanism can be adjusted by moving the nut member that is screwed onto the knob mounting portion forward and backward relative to the lever member and the knob mounting portion by pivoting the second rear drag knob. Thus, there will no longer be any need to provide gaps between the second rear drag knob and the rear portion of the reel unit and between the second rear drag knob and the front portion of the first rear drag knob, to give a room for the lever member to move. Thus, it is difficult for foreign matter to enter inside the reel unit. Also, the design of the silhouette of the rear drag operational structure can be improved.

In a rear drag operation structure for a spinning reel according to a second aspect of the present invention is the rear drag operation structure for a spinning reel disclosed in the first aspect of the present invention, in which the nut member has at least one first recess that is formed on an outer periphery of a rear end portion of the nut member so as to extend frontward, and the lever member includes a tubular lever part and a first projection that is formed on an inner periphery of the tubular lever part so as to engage with the first recess.

In this configuration, the lever member can be easily positioned on the rear portion of the nut member because the first projections formed on the inner periphery of the tubular lever part of the lever member can engage with the first recess formed in the outer periphery of the nut member. In addition, when the second rear drag knob is pivoted, the first projection of the lever member will mesh with the first recess of the nut member, and the nut member will rotate together with the lever member. When this occurs, the first recess of the nut member will slide forward and backward on the first projection of the lever member, and the nut member will move forward and backward relative to the lever member and the knob mounting portion. Thus, the drag force of the rear drag mechanism can be adjusted by moving the nut member forward and backward relative to the lever member and the knob mounting portion. In this way, there will no longer be any need to provide gaps between the second rear drag knob and the rear portion of the reel unit and between the second rear drag knob and the front portion of the first rear drag knob to give a room for the lever member to move. Thus, it is difficult for foreign matter to enter inside the reel unit. Then, the design of the silhouette of the rear drag operational structure can be improved.

In a rear drag operation structure for a spinning reel according to a third aspect of the present invention is the rear drag operation structure for a spinning reel disclosed in the first or second aspect, in which the nut member has at least one second recess that is formed on an outer periphery of a front end portion of the nut member so as to extend rearward, and the lever member includes a tubular lever part and a second projection that is formed on an inner periphery of the tubular lever part so as to engage with the second recess.

In this configuration, the lever member can be easily positioned on the front portion of the nut member because the second recess formed on the inner periphery of the tubular portion of the lever member can engage with the second projection formed in the outer periphery of the nut member. In addition, when the second rear drag knob is pivoted, the second recess of the lever member will mesh with the second projection of the nut member, and the nut member will rotate together with the lever member. When this occurs, the second projection of the nut member will slide forward and backward on the second recess of the lever member, and the nut member will move forward and backward relative to the lever member and the knob mounting portion. Thus, the drag force of the rear drag mechanism can be adjusted by moving the nut member forward and backward relative to the lever member and the knob mounting portion. In this way, there will no longer be any need to provide gaps between the second rear drag knob and the rear portion of the reel unit and between the second rear drag knob and the front portion of the first rear drag knob to give a room for the lever member to move. Thus, it is made difficult for foreign matter to enter inside the reel unit. Then, the design of the silhouette of the rear drag operational structure can be improved.

In a rear drag operation structure for a spinning reel according to a fourth aspect of the present invention is the rear drag operation structure for a spinning reel disclosed in any of the first to third aspects, in which the first rear drag knob is mounted on the knob mounting portion so that the first rear drag knob is rotatable but not movable forward and backward relative to the knob mounting portion. The second rear drag knob is adapted to be disposed such that the second rear drag knob substantially contacts the rear portion of the reel unit and the first rear drag knob.

In this configuration, even if the first rear drag knob is rotated, the first rear drag knob will not move forward and backward relative to the knob mounting portion because the first rear drag knob is mounted on the knob mounting portion to be rotatable but not movable forward and backward therewith. Thus, the gap between the rear portion of the second rear drag knob and the front portion of the first rear drag knob can be prevented from increasing in size. In addition, although the front portion of the second rear drag knob and the rear portion of the reel unit and the rear portion of the second rear drag knob and the front portion of the first rear drag knob substantially contact one another, there are still micro clearances therebetween. Accordingly, an initial dynamic load when the second rear drag knob is pivoted can be reduced. The smaller the gaps become, the more difficult it can be made for foreign matter to enter into the reel unit. Then, the design of the silhouette of the rear drag operational structure can be improved.

In a rear drag operation structure for a spinning reel according to a fifth aspect of the present invention is the rear drag operation structure for a spinning reel disclosed in any of the first to fourth aspects, further including a sound generating mechanism that generates sound when the second rear drag knob is pivoted in a predetermined pivot range and is arranged between the second rear drag knob and the knob mounting portion. The sound generating mechanism includes a plurality of sounding recesses, a mounting recess, a sounding pin, and an urging member. The plurality of sounding recesses are formed circumferentially spaced apart in the inner periphery of the second rear drag knob in accordance with the pivot range. The mounting recess is formed in the outer periphery of the knob mounting portion in a position opposite the sounding recess. The sounding pin is mounted in the mounting recess such the sounding pin engages with the sounding recesses. The urging member is disposed in the mounting recess and urges the sounding pin toward the sounding recesses.

With this rear drag operation structure for a spinning reel, when the second rear drag knob is pivoted, the sounding pin mounted in the knob mounting portion is urged toward the sounding recess side formed in the second rear drag knob by the urging member, and the sounding pin engages with the plurality of sounding recesses and generates sound. Thus, even when the sound generating mechanism is arranged between the second rear drag knob and the knob mounting portion, the drag force of the rear drag mechanism can be adjusted by moving the nut member forward and backward relative to the lever member and the knob mounting portion. In this way, there will no longer be any need to provide gaps between the second rear drag knob and the rear portion of the reel unit and between the second rear drag knob and the front portion of the first rear drag knob in order to give a room for the lever member to move. Thus, it is difficult for foreign matter to enter inside the reel unit. Then, the design of the silhouette of the rear drag operational structure can be improved.

In a rear drag operation structure for a spinning reel according to a sixth aspect of the present invention is the rear drag operation structure for a spinning reel disclosed in any of the first to fifth aspects, wherein the knob mounting portion has a female threaded portion formed on an inner peripheral surface of the tubular portion, and the first rear drag knob includes a pressure member that engages the female threaded portion of the knob mounting portion, such that the pressure member is rotatable and movable forward and backward relative to the knob mounting portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
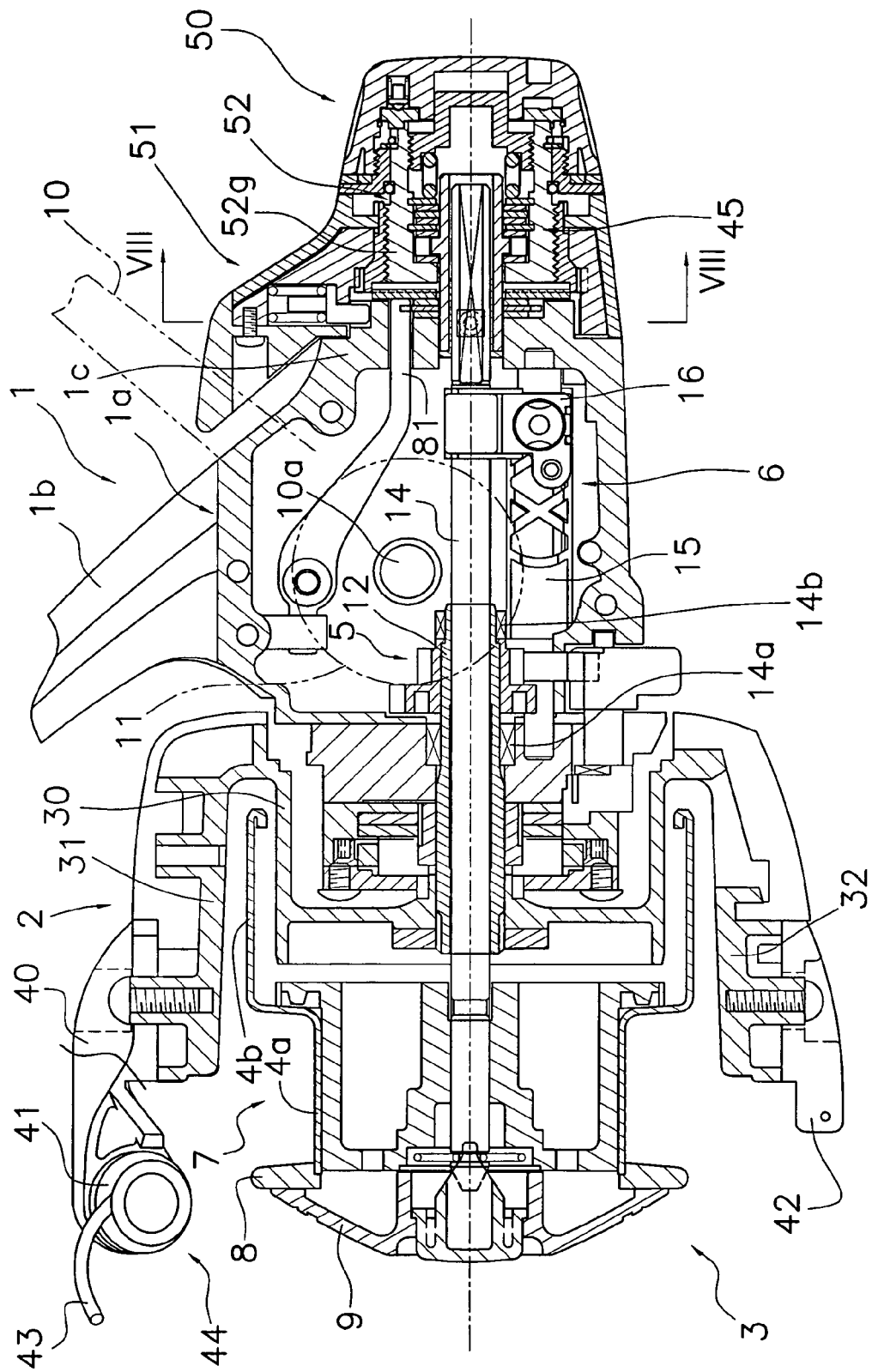
FIG. 1 is a cross sectional view of a spinning reel according to one embodiment of the present invention.

FIG. 1 shows a spinning reel according to an embodiment of the present invention.

As shown in FIG. 1, the spinning reel primarily includes a reel unit 1 that rotatively supports a handle 10, a rotor 2, a spool 3, a first rear drag knob 50, and a second rear drag knob 51.

Reel Unit

The reel unit 1 includes a reel body 1a, and a rod attachment leg 1b that extends diagonally upward and forward from the reel body 1a. An accommodation space is formed in the interior of the reel body 1a. A rotor drive mechanism 5 that rotates the rotor 2 in conjunction with the rotation of the handle 10, and an oscillating mechanism 6 that moves the spool 3 back and forth to uniformly wind fishing line, are arranged in the accommodation space.

Figure 2:
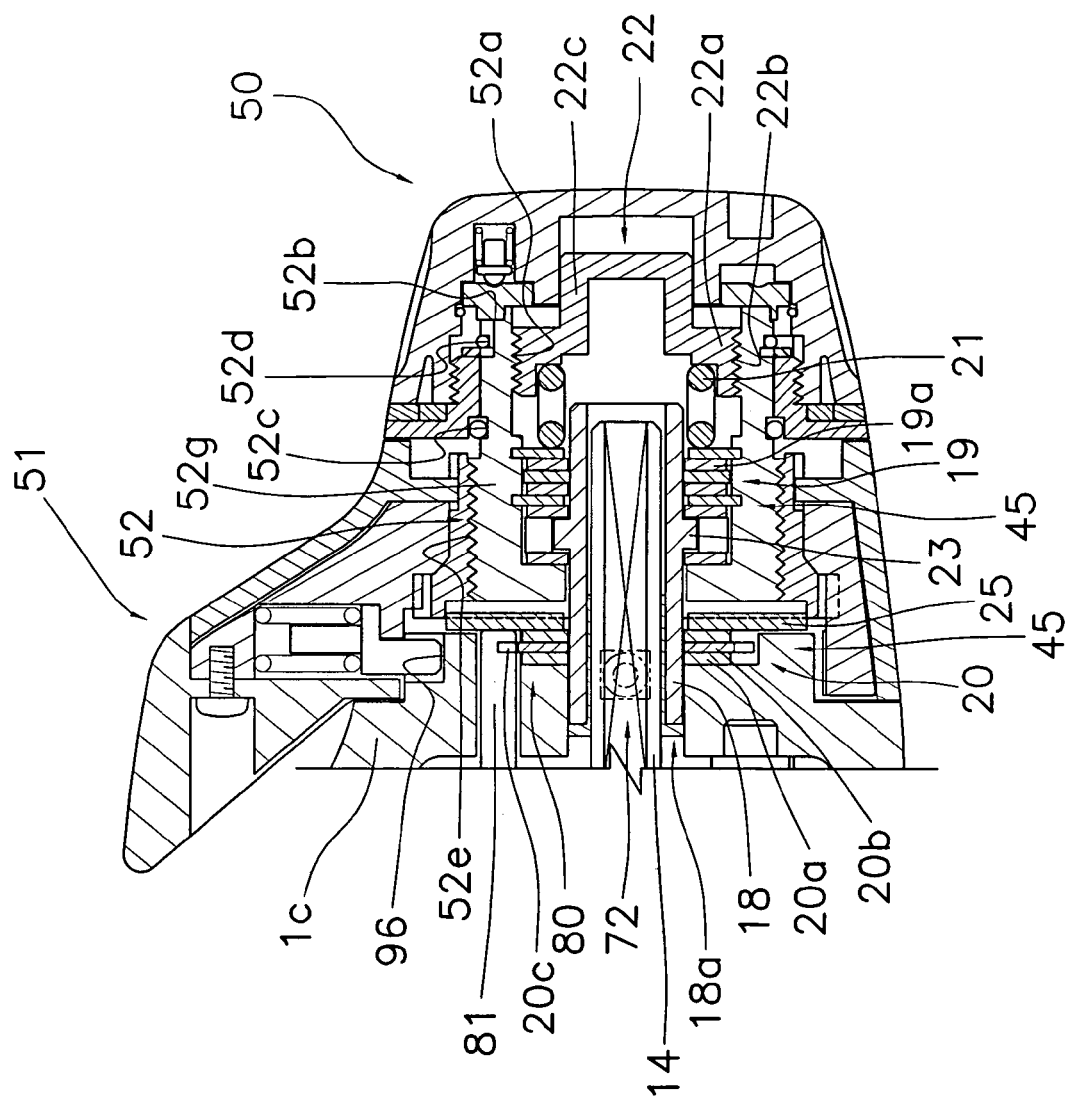
FIG. 2 is an enlarged cross sectional view of the rear portion of the spinning reel according to the embodiment of the present invention.
Figure 4:
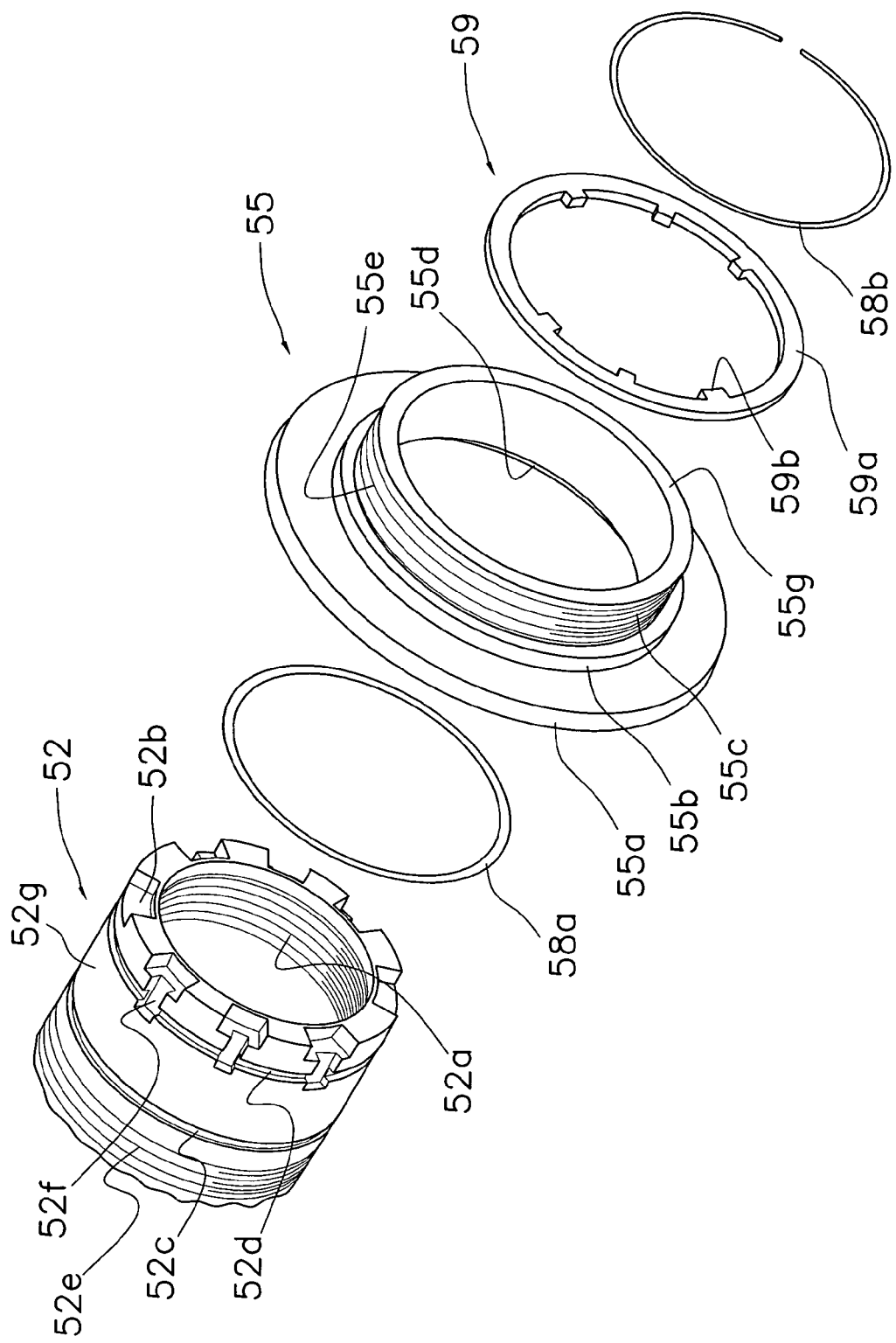
FIG. 4 is an exploded perspective view of a retaining structure of the spinning reel according to the embodiment of the present invention.

As shown in FIGS. 2 and 4, a knob mounting portion 52 that includes a tubular portion 52g that projects rearward from a rear portion 1c of the reel body 1a is arranged on the rear portion 1c. A plurality of first engagement recesses 52b are formed spaced apart by a predetermined distance in the circumferential direction on the rear end surface of the tubular portion 52g of the knob mounting portion 52. In addition, a first female threaded portion 52a is formed on a rear inner peripheral surface of the tubular portion 52g of the knob mounting portion 52, and a third male threaded portion (male threaded portion) 52e is formed on the outer peripheral surface of the tubular portion 52g of the knob mounting portion 52. An annular first annular groove 52c and an annular second annular groove 52d are formed in a predetermined spaced relationship in the rear portion of the third male threaded portion 52e. Then, second engagement recesses 52f are formed in the rear end of the knob mounting portion 52 extending axially through the second annular groove 52d. The second engagement recesses 52f are formed in a predetermined spaced relationship in the circumferential direction, and the depths thereof are deeper than the depth of the second annular groove 52d.

As shown in FIG. 1, a positioning recess 96 is arranged adjacent to the third male threaded portion 52e of the knob mounting member 52 in order to position the second rear drag knob 51. Both side surfaces of the positioning recess 96 in the rotational direction are formed in a fan-shaped taper from the circumferential the bottom portion of the positioning recess 96 to the opening thereof. In addition, a second mounting recess 72 is arranged in front of the third male threaded portion 52e of the knob mounting portion 52 in order to mount a second sounding pin 73 and a second coil spring 74 described below.

Rotor

The rotor 2 is rotatively supported on the front of the reel unit 1. As shown in FIG. 1, the rotor 2 includes a rotor cylindrical portion 30, a first rotor arm 31 and a second rotor arm 32. The first and second rotor arms 31, 32 are arranged on mutually opposing positions of the rotor cylindrical portion 30. The rotor cylindrical portion 30 and the first and second rotor arms 31, 32 are, for example, made of an aluminum alloy, and are formed to be integral with the rotor cylindrical portion 30. The first and second rotor arms 31, 32 are connected to the circumferential surface of the rotor cylindrical portion 30 such that the bases of the first and second rotor arms 31, 32 extend in the circumferential direction on the circumferential surface of the rotor cylindrical portion 30. The first and second rotor arms 31, 32 project outward from the rotor cylindrical portion 30 and then curve and extend forward. A first bail support member 40 is pivotably mounted to the tip of the first rotor arm 31. A line roller 41 for guiding fishing line to the spool 3 is mounted to the front end of the first bail support member 40. A second bail support member 42 is pivotably mounted to the front end of the second rotor arm 32. A bail 43 that is a wire member curved into an approximate U-shape is fixedly held between the line roller 41 and the second bail support member 42. The first bail support member 40, the second bail support member 42, the line roller 41, and the bail 43 form a bail arm 44 that guides the fishing line onto the spool 3. The bail arm 44 can pivot between a line-guiding posture shown in FIG. 1 and a line-releasing posture which flips from the line-guiding posture.

Rotor Drive Mechanism

As shown in FIG. 1, the rotor drive mechanism 5 includes a face gear 11 and a pinion gear 12. The face gear 11 rotates together with a handle shaft 10a that is connected to the handle 10, and the pinion gear 12 meshes with the face gear 11. The pinion gear 12 is formed in a tubular shape, and a central portion and a rear end portion thereof in the axial direction are rotatively supported on the reel body 1a via bearings 14a and 14b. A front portion of the pinion gear 12 passes through the center portion of the rotor 2 and extends toward the spool 3. A spool shaft 14 passes through the inner peripheral portion of the pinion gear 12, and slidably moves forward and backward along the rotational axis of the pinion gear 12.

Spool

The spool 3 winds fishing line around the outer peripheral surface thereof, and as shown in FIG. 1, is mounted on the front portion of the rotor 2 so that the spool 3 can be shifted back and forth. The spool 3 is composed of a spool unit 7, a brim 8, and a brim fixing member 9. The spool unit 7 includes a bobbin 4a and a skirt portion 4b. The bobbin 4a is formed into a tubular shape and fishing line is wound around the outer periphery thereof. The skirt portion 4b is formed such that the diameter thereof is larger than the outer diameter of the bobbin 4a, and is formed to be integral with the rear portion of the bobbin portion 4a. The brim 8 is mounted on the front portion of the bobbin portion 4a, and is fixed to the spool unit 7 by the bobbin fixing member 9.

Oscillating Mechanism

As shown in FIG. 1, the oscillating mechanism 6 is a device that causes the spool shaft 14 connected to the spool 3 to move forward and backward, and cause the spool 3 to move in the same direction. The oscillating mechanism 6 includes a worm 15 disposed below and parallel to the spool shaft 14, a slider 16 that moves back and forth along the worm 15, a guide shaft (not shown in the figures) that is disposed parallel to the spool shaft 14, and an intermediate gear (not shown in the figures) that is fixedly coupled to the front end of the worm 15. Here, the slider 16 is non-rotatably mounted to the spool shaft 14.

Rear Drag Mechanism

The rear drag mechanism 45 is a mechanism that causes a drag force to be applied to the spool 3. As shown in FIG. 2, the rear drag mechanism 45 is composed of a cylindrical first bush 18, first and second friction engagement portions 19, 20 that include a plurality of friction plates 19a, 20a, a coil spring 21 for pressing the first friction plates 19a of the first friction engagement portion 19 and a first pressure member 22 for urging the friction plates 19a of the first friction engagement portion 19, and a second pressure member 25 for urging the friction plates 20a of the second friction engagement portion 20.

The first bush 18 is formed in a tubular shape in which the outer peripheral surface thereof has mutually parallel chamfered portions. A second bush 18a is non-rotatably and non-slidably fitted into the front portion of the inner periphery of the first bush 18. The second bush 18a is also formed in a tubular shape in which the outer peripheral surface thereof has mutually parallel chamfered portions. The second bush 18a is, for example, made of a synthetic resin that is highly slidable, and the spool shaft 14 is non-rotatably and slidably fitted into the inner periphery thereof. Thus, by disposing the highly slidable second bush 18a between the first bush 18 and the spool shaft 14, the spool shaft 14 can smoothly slide in the inner peripheral portions of the first and second bushes 18, 18a.

A flange portion 23 is arranged on the outer peripheral surface of the rear portion of the first bush 18. The friction plates 19a of the first friction engagement portion 19 are disposed to the front and rear of the flange portion 23. The coil spring 21 is disposed on the rear portion of the first friction engagement portion 19. The first pressure member 22 is connected in series with the rear portion of the coil spring 21. A front portion 22a of the first pressure member 22 is formed into a cylindrical shape, and a first male threaded portion 22b is arranged on the outer peripheral surface thereof. In addition, a rear portion 22c of the first pressure member 22 is formed into a closed-end tubular shape having a diameter that is smaller than the front portion 22a of the first pressure member 22, and the outer peripheral surface of the rear portion 22c has two chamfered portions that are parallel to each other.

A plate member 20b non-rotatably mounted on the outer periphery of the first bush 18 is interposed by the friction plates 20a of the second friction engagement portion 20. Projections 20c that engage with a sounding spring 81 (described below) are formed on the outer peripheral surface of the plate member 20b so as to be spaced apart by a predetermined distance in the circumferential direction. A second pressure member 25 is disposed on the rear portion of the second friction engagement portion 20, and engages with an engagement portion 25b of the second rear drag knob 51 (described below).

The first male threaded portion 22b of the first pressure member 22 is rotatively mounted on the first female threaded portion 52a formed in the inner peripheral surface of the knob mounting member 52. The first pressure member 22 can rotate in the interior of the knob mounting portion 52 while moving forward and backward, and compresses and decompresses the coil spring 21. The second pressure member 25 is rotatively mounted on the outer periphery of the first bush 18. When the second pressure member 25 rotates and presses on the friction plates 20a of the second friction engagement portion 20, both surfaces of the plate member 20b are pressed by the friction plate 20a.

First Rear Drag Knob

Figure 3:
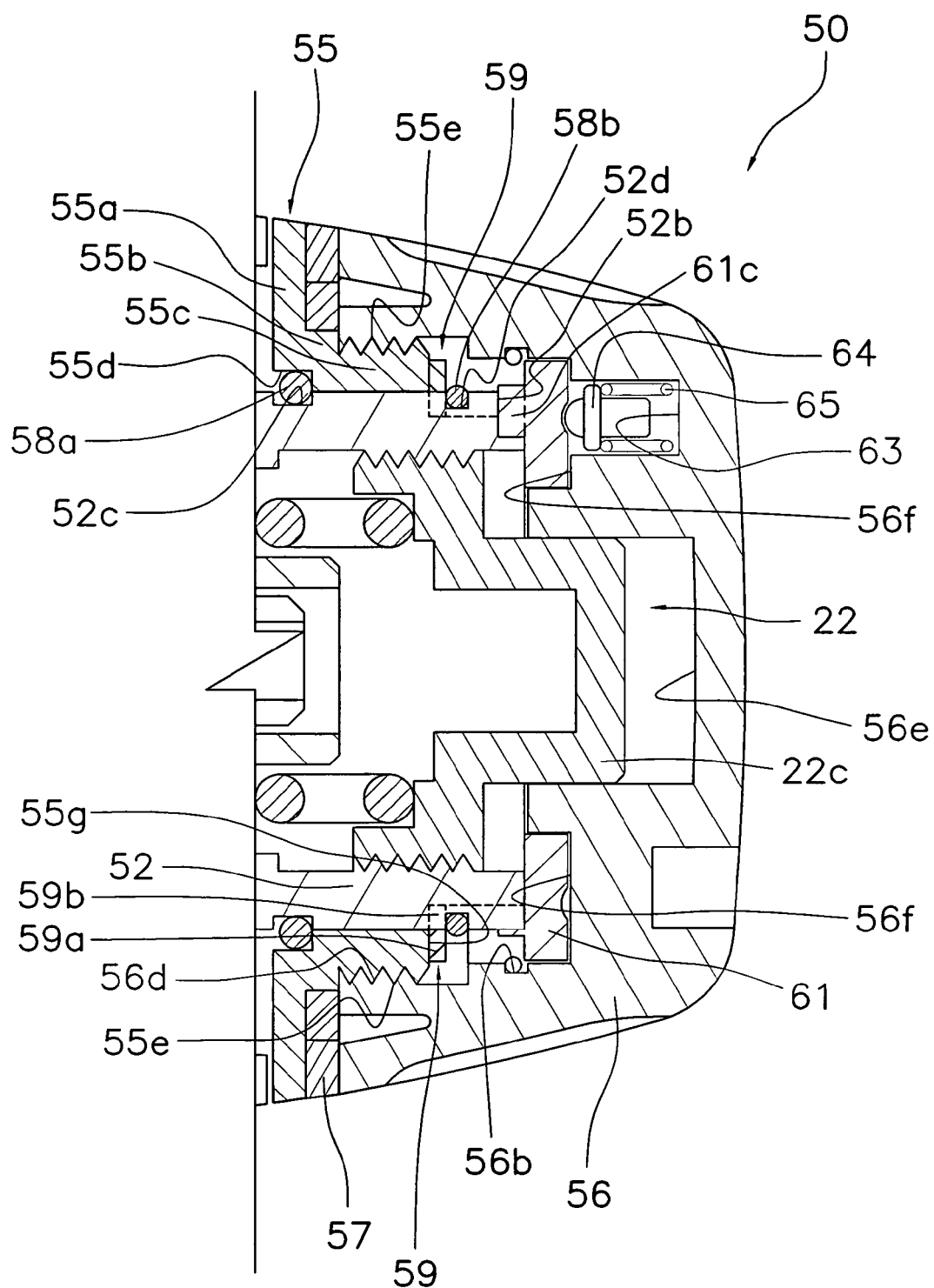
FIG. 3 is an enlarged cross sectional view of a first rear drag knob of the spinning reel according to the embodiment of the present invention.

The first rear drag knob 50 serves to finely adjust the drag force of the rear drag mechanism 45, and as shown in FIGS. 3 and 4, includes a first knob member 55, a second knob member 56, and a ring member 57. The first knob member 55 is, for example, made of a synthetic resin, and is formed into a tubular shape. The first knob member 55 includes a first tubular portion 55a, a second tubular portion 55b, 55b, and a third tubular portion 55c, and the first to third tubular portions 55a, 55b, 55c are formed integrally with each other.

An annular third annular groove 55d is arranged in the front portion of the inner peripheral surface of the first tubular portion 55a. A first engagement member 58a is fitted in the third engagement groove 55d and the first annular groove 52c of the knob mounting portion 52. Here, for example, an O-ring is employed as the first engagement member 58a. The second tubular portion 55b is integrally formed with the rear end of the first tubular portion 55a, and the outer diameter of the second tubular portion 55b is smaller than the outer diameter of the first tubular portion 55a. The third tubular portion 55c is integrally formed with the rear end of the second tubular portion 55b, and the outer diameter of the third tubular portion 55c is smaller than the outer diameter of the second tubular portion 55b. A second male threaded portion 55e is arranged on the outer peripheral surface of the third tubular portion 55c.

A retaining engagement surface 55g is arranged on the rear end of the third tubular portion 55c. The retaining engagement surface 55g is formed in a planar shape that is substantially perpendicular to the rotational axis. A washer 59 is disposed on the rear end of the retaining engagement surface 55g. The washer 59 includes a circular portion 59a and projections 59b. The circular portion 59a is in contact with the retaining engagement surface 55g. The projections 59b are formed so that they project inward from the inner peripheral surface of the circular portion 59a and can engage with the plurality of second engagement recesses 52f. The washer 59 is positioned by a second engagement member 58b. The second engagement member 58b is brought into contact with the rear surface of the washer 59 while being inserted into the second annular groove 52d formed in the knob mounting portion 52. Here, for example, a C-shaped retaining ring is employed as the second engagement member 58b, and the outer diameter is larger than the inner diameter of the circular portion 59a of the washer 59.

The second knob member 56 is, for example, made of a synthetic resin, and is formed into a closed-end tubular shape. First and second engagement portions 56e, 56f are provided on the closed end portion of the second knob member 56. The first engagement portion 56e is an oval-shaped hole formed in the central bottom portion thereof. The rear portion 22c of the first pressure member 22 is chamfered in parallel on the outer peripheral surface thereof and is engaged with the first engagement portion 56e. The rear portion 22c of the first pressure member 22 is non-rotatable in the first engagement portion 56e and can slide forward and backward therein. The second engagement portion 56f is formed in a toroidal recessed shape in the outer periphery of the closed end portion of the second knob member 56. A sounding member 61 (described below) is engaged with the second engagement portion 56f. In addition, a first mounting recess 63 is formed in the bottom portion of the second engagement portion 56f that is formed in a toroidal recessed shape, and a first sounding pin 64 and a first coil spring 65 (described below) are disposed in the first mounting recess 63.

An annular fourth annular groove 56b and a second female threaded portion 56d are arranged on the inner peripheral surface of the second knob member 56. The fourth annular groove 56b is formed on the closed end side of the second knob member 56, and has a diameter that is larger than the outer diameter of the sounding mechanism 61 described below. The second female threaded portion 56d is formed on the open side of the second knob member 56. The second knob member 56 is connected to the first knob member 55 by screwing the second female threaded portion 56d together with the second male threaded portion 55e of the first knob member 55. When this occurs, the ring member 57 will be disposed between the first knob member 55 and the second knob member 56. The ring member 57 is, for example, made of aluminum. Note that the design of the first rear drag knob 50 can be improved by installing the ring member 57 between the first knob member 55 and the second knob member 56.

Second Rear Drag Knob

Figure 5:
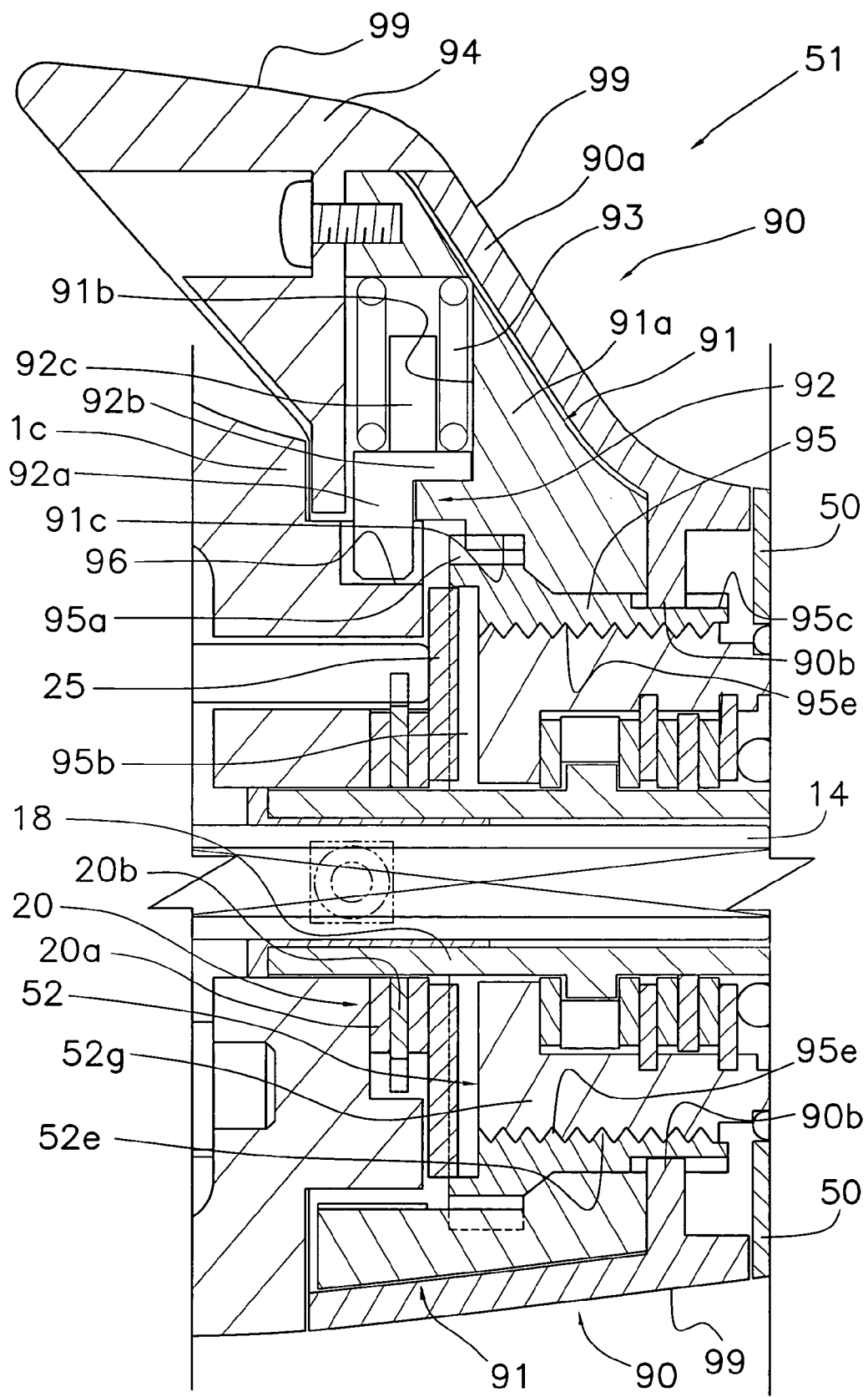
FIG. 5 is an enlarged cross sectional view of a second rear drag knob of the spinning reel according to the embodiment of the present invention.

The second rear drag knob 51 serves to adjust the drag force of the rear drag mechanism 45 more quickly than the first rear drag knob 50 does, and is disposed between the rear portion 1c of the reel body 1a and the front portion of the first rear drag knob 50. As shown in FIG. 5, the second rear drag knob 51 includes a first lever member (lever member) 90, a second lever member (lever member) 91, a positioning pin 92 and a fourth coil spring 93, a fixing member (lever member) 94, and a tubular member (nut member) 95. The first lever member 90 is formed in a tubular shape, and includes a first lever portion 90a that projects radially outward from the outer peripheral surface of the first lever portion 90a. The first lever portion 90a includes an accommodation portion that opens in the forward direction, and a second lever portion 91a (described below) can be accommodated in this accommodation portion. In addition, first engagement projections (first projections) 90b are formed in a predetermined spaced relationship in the circumferential direction on the first lever member 90 and project toward the inner peripheral portion thereof. Furthermore, a minute gap is provided between the rear portion of the first lever member 90 and the front portion of the first rear drag knob 50. Then, when the second rear drag knob 51 is pivoted, the rear portion of the first lever member 90 can come into contact with the front portion of the first rear drag knob 50. The second lever member 91 is formed into a tubular shape, and is disposed on the inner peripheral side of the first lever member 90. The second lever member 91 includes a second lever portion 91a that is formed to project radially outward, and by accommodating the second lever portion 91a in the accommodation portion of the first lever portion 90a, the second lever member 91 will not rotate with respect to the first lever member 90. In addition, second engagement recesses (second recesses) 91c are formed in a predetermined spaced relationship in the circumferential direction on the inner peripheral surface of the second lever member 91. A fourth mounting recess 91b is formed in the second lever portion 91a, and the fourth mounting recess 91b is disposed such that the opening therein is facing the forward direction. A positioning pin 92 and a fourth coil spring 93 are mounted in the fourth mounting recess 91b.

The positioning pin 92 includes a fourth head portion 92a, a fourth mounting portion 92b, and a fourth shaft portion 92c. The fourth head portion 92a and the fourth mounting portion 92b are integrally formed into a shape that resembles an upside down L. The fourth head portion 92a is formed to point in the rotation shaft direction (downward as viewed in FIG. 5), and the fourth mounting portion 92b is formed to point horizontally (approximately parallel to the rotation shaft). The fourth head portion 92a is formed into a rectangular column shape, and both side surfaces of the tip portion thereof are tapered. The front end of the fourth mounting portion 92b is engaged with the bottom side surface (right hand side surface as viewed in FIG. 5) of the fourth mounting recess 91b. The fourth shaft portion 92c is a shaft shaped portion that is connected to the fourth mounting portion 92b, and the fourth coil spring 93 can be disposed around the outer periphery thereof. The base end of the fourth coil spring 93 is brought into contact with the side surface (upper side as viewed in FIG. 5) of the fourth mounting recess 91b, and the tip end (bottom end as viewed in FIG. 5) is brought into contact with a step portion between the fourth mounting portion 92b and the fourth shaft portion 92c. The fourth coil spring 93 is stored in the fourth mounting recess 91b in the compressed state, and urges the positioning pin 92 toward the positioning recess 96. Thus, if the positioning pin 92 and the fourth coil spring 93 are disposed in the fourth mounting recess 91b, when the second rear drag knob 51 is pivoted, the positioning pin 92 will arrive at a position opposite the positioning recess 96 formed in the upper portion of the knob mounting member 52, and the head portion 92a of the positioning pin 92 will engage with the positioning recess 96.

The fixing member 94 serves to prevent the positioning pin 92 and the fourth coil spring 93 from falling out from the fourth mounting recess 91b, and is, for example, fixed to the lever member 91 with a bolt. This allows the second rear drag knob 51 to be assembled sequentially starting with a member positioned in front and working its way rearward. In addition, a minute gap is provided between the front portion of the fixing member 94 and the rear portion 1c of the reel body 1a. Then, when the second rear drag knob 51 is pivoted, the front portion of the fixing member 94 can come into contact with the rear portion 1c of the reel body 1a.

The outer diameter of the front portion of the tubular member 95 is formed to be larger than the outer diameter of the central portion thereof, and a step portion between the front portion and the central portion is formed into a taper shape. Second engagement projections (second projections) 95a are formed from the front end rearward on the front outer peripheral surface of the tubular member 95, and a plurality of these second engagement projections 95a are disposed circumferentially spaced apart on the tubular member 95. An engagement portion 95b that serves to transmit the movement of the second rear drag knob 51 to the second pressure member 25 is formed on the front inner peripheral edge of the tubular member 95. In addition, first engagement recesses (first recesses) 95c are formed from the rear end forward on the rear outer peripheral surface of the tubular member 95, and a plurality of these first engagement recesses 95c are disposed circumferentially spaced apart on the tubular member 95. The second engagement projections 95a of the tubular member 95 are engaged with the second engagement recesses 91c of the second lever member 91, and the first engagement recesses 95c are engaged with the first engagement projections 90b of the first lever member 90. When this occurs, the stepped portion and the central portion of the tubular member 95 will be in contact with the inner peripheral surface of the second lever member 91. Thus, the tubular member 95 will be mounted such that it is not relatively rotatable but relatively movable forward and backward with respect to the first and second lever members 90, 91. In addition, a third female threaded portion 95e is arranged on the inner peripheral surface of the tubular member 95, and by screwing the third female threaded portion 95e onto the third male threaded portion 52e of the knob mounting portion 52, the tubular member 95 will be rotatively mounted to the knob mounting portion 52.

In the second rear drag knob 51, the material employed for the first lever member 90 and the fixing member 94 is different from the material employed for the second lever member 91. For example, the first lever member 90 and the fixing member 94 are made from ABS resin, and the second lever member 91 is made from a synthetic resin. A metal plate layer 99 is plated onto the surface layer side of the first lever member 90 and the fixing member 94. By forming the first lever member 90 and the fixing member 94 from a material that is different from the second lever member 91, shrink marks caused by deviations in thickness can be prevented when the plate layer 99 is plated by the plating process.

Rear Drag Sound Generating Mechanism

The rear drag sound generating mechanism includes a first rear drag sound generating mechanism 60 (a sound generating mechanism used when the first rear drag knob is operated), a second rear drag sound generating mechanism 70 (a sound generating mechanism used when the second rear drag knob is operated), and a third rear drag sound producing mechanism 80 (a sound producing mechanism used when the drag is operated).

First Rear Drag Sound Generating Mechanism

Figure 6:
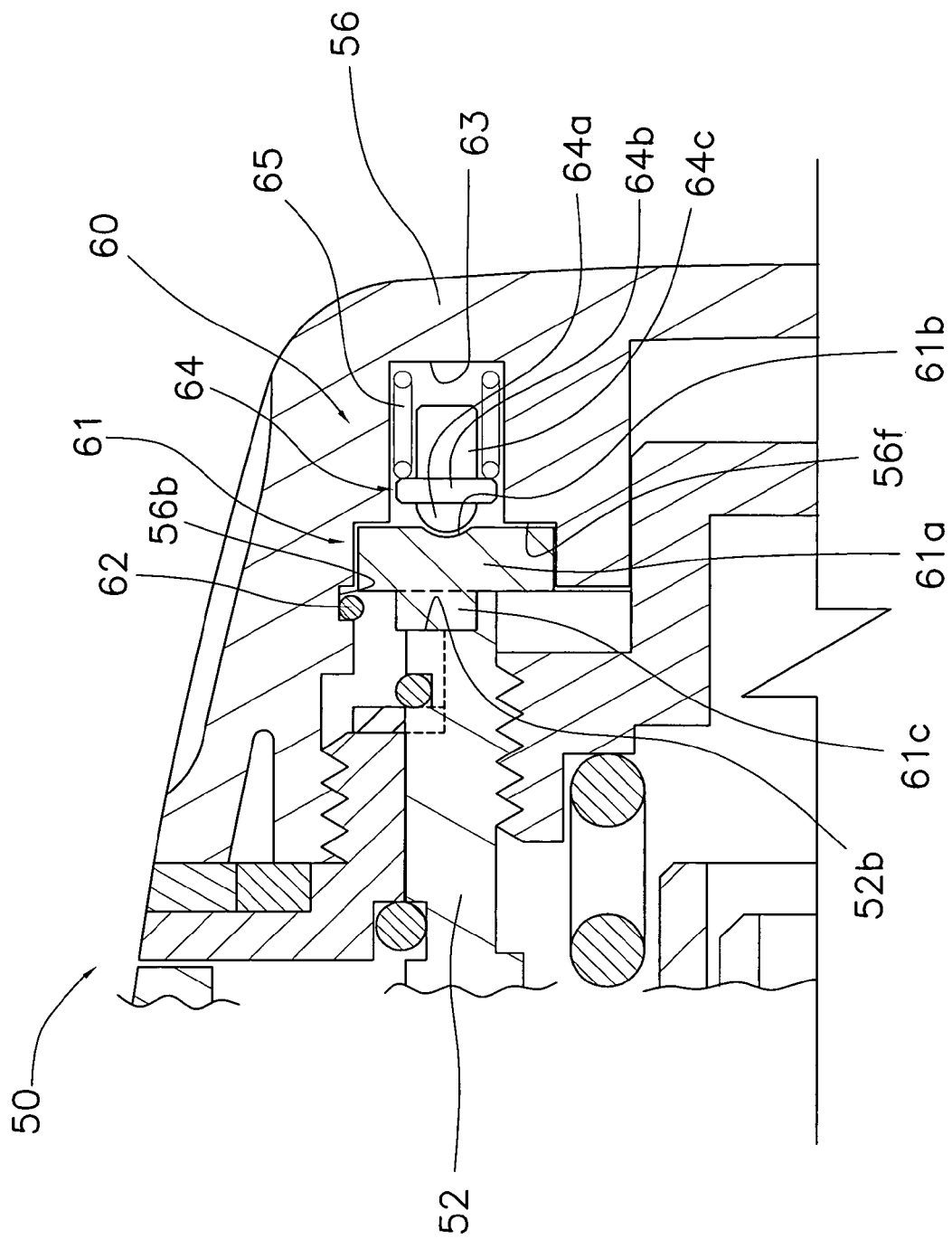
FIG. 6 is an enlarged cross sectional view of a first rear drag sound generating mechanism installed on the spinning reel according to the embodiment of the present invention.
Figure 7:
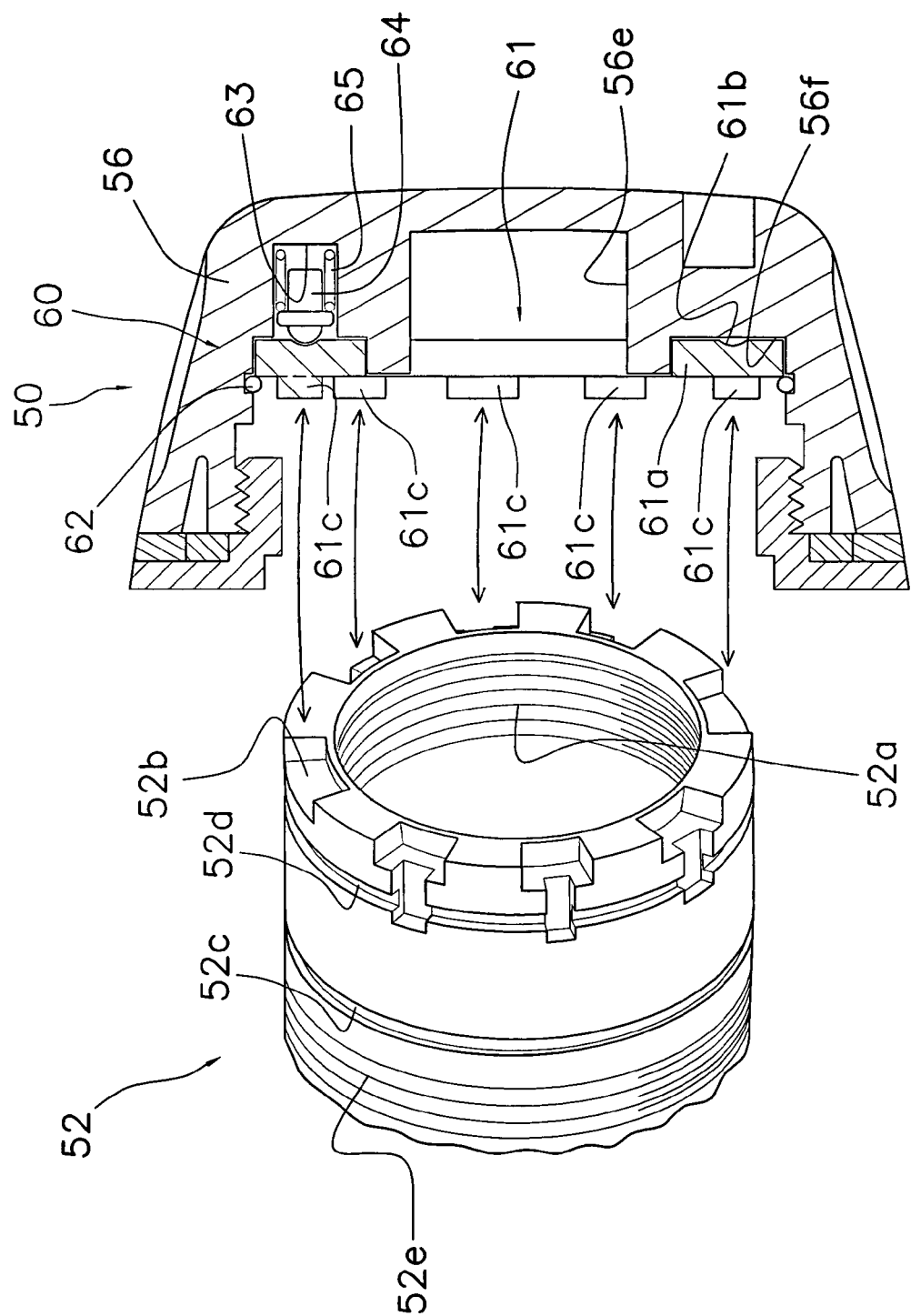
FIG. 7 is a schematic view of a knob mounting portion of the spinning reel and a cross sectional view of a first rear drag knob according to the embodiment of the present invention.

As shown in FIGS. 6 and 7, the rear drag sound generating mechanism 60 is disposed between the knob mounting portion 52 and the second knob member 56, and generates sound by the relative rotation of the knob mounting portion 52 and the first rear drag knob 50. The first rear drag sound generating mechanism 60 includes a sounding member 61, a retaining member 62, a first mounting recess 63, a first sounding pin 64, and a first coil spring 65.

The sounding member 61 includes a disk portion 61a that is formed into a ring shape, a plurality of sounding recesses 61b that are disposed spaced apart in the rotational direction in one surface of the disk portion 61a, and engagement portions 61c that are integrally formed with another surface of the disk portion 61a. The disk portion 61a of the sounding member 61 is engaged with the second engagement portion 56f of the second knob member 56, and can rotate with respect to the second knob member 56. In addition, the outer diameter of the disk portion 61a is formed to be smaller than the inner diameter of the fourth annular groove 56b. The engagement portion 61c is formed to project toward the first engagement recesses 52b formed in the rear end surface of the knob mounting portion 52, and engages with the first engagement recesses 52b. The retaining member 62 is arranged in order to prevent the sounding member 61 from falling out. The retaining member 62 is, for example, a C-shaped retaining ring, and is disposed in the fourth annular groove 56b. The inner diameter of the retaining member 62 is formed to be smaller than the outer diameter of the disk portion 61a of the sounding member 61. The first mounting recess 63 is formed in the closed end of the second knob member 56, in a position opposite the plurality of first sounding recesses 61b.

The first sounding pin 64 is mounted in the first mounting recess 63 so as to be able to move forward and backward, and engages with the first sounding recesses 61b of the sounding member 61. The first sounding pin 64 includes a first head portion 64a, a first mounting portion 64b that is connected to the first head portion 64a, and a first shaft portion 64c that is connected to the first mounting portion 64b. The first head portion 64a is formed such that the front end thereof is a smooth convex shape. The front end of the front head portion 64a generates a clicking sound by repeatedly striking the first sounding recesses 61b. Here, the front end of the first head portion 64a of the first sounding pin 64 is formed in a smooth convex shape, and thus the first sounding pin 64 generates clicking sounds with little resistance. The first mounting portion 64b is formed to have a diameter that is larger than that of the first head portion 64a and smaller than the inner diameter of the first mounting recesses 63. The first shaft portion 64c is a shaft shaped component that is formed to have a diameter that is smaller than that of the first mounting portion 64b, and the first coil spring 65 can be disposed around the outer periphery of the first shaft portion 64c. Thus, by forming the first shaft portion 64c to have a diameter that is smaller than that of the first mounting portion 64b, the front end of the first coil spring 65 can be brought into contact with the step portion between the first mounting portion 64b and the first shaft portion 64c.

The first coil spring 65 is disposed on the outer periphery of the first shaft portion 64c of the first sounding pin 64. Accordingly, the base end of the first coil spring 65 is brought into contact with the bottom portion of the first mounting recess 63, and the front end of the first coil spring 65 is brought into contact with the step portion between the first mounting portion 64b and the first shaft portion 64c. The first coil spring 65 is accommodated in the first mounting recess 63 in the compressed state, and urges the first sounding pin 64 toward the first sounding recesses 61b.

Second Rear Drag Sound Generating Mechanism

Figure 8:
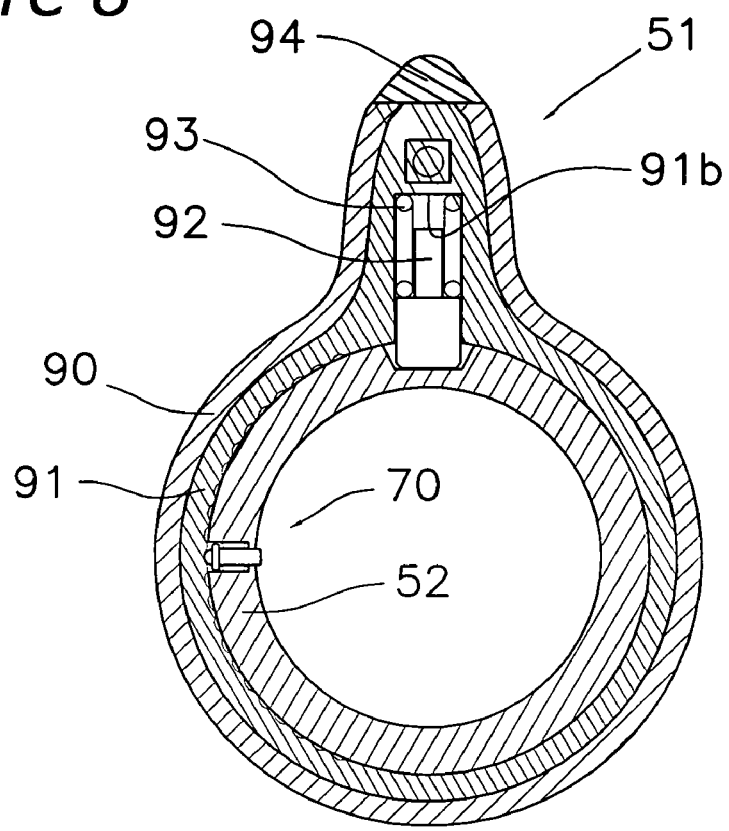
FIG. 8 is a cross sectional view of a second rear drag sound generating mechanism installed in the spinning reel according to the embodiment of the present invention, viewed along line VIII—VIII of FIG. 1.
Figure 9:
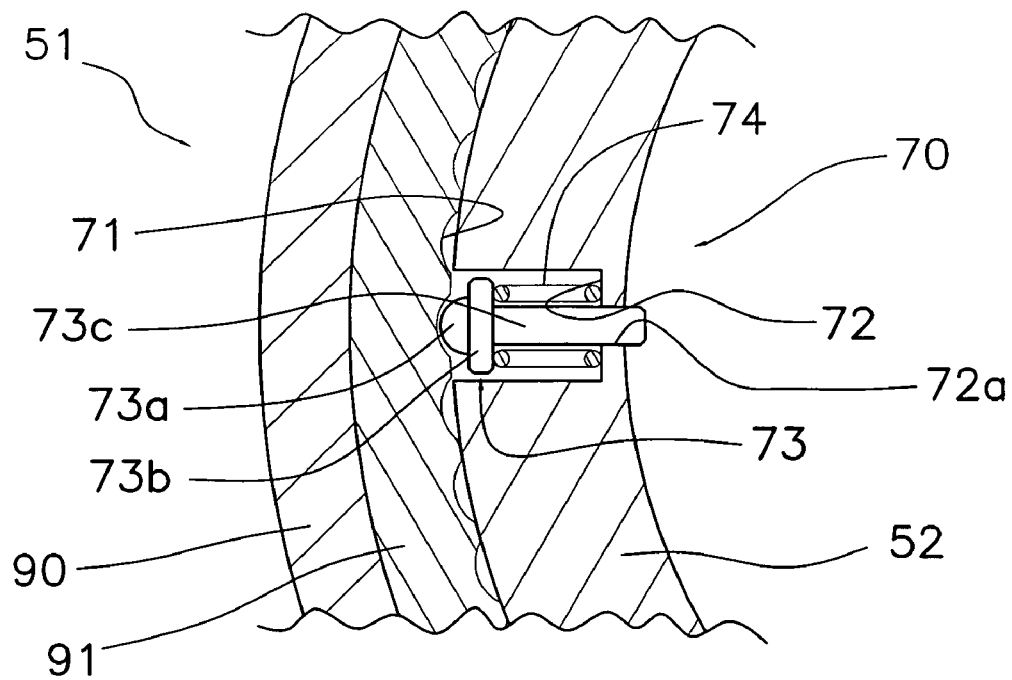
FIG. 9 is an enlarged cross sectional view of the second rear drag sound generating mechanism according to the embodiment of the present invention.

As shown in FIGS. 8 and 9, the second rear drag sound generating mechanism 70 is disposed between the knob mounting portion 52 and the second lever member 91 that is non-rotatively accommodated in the first lever member 90, and generates sound by pivoting of the second rear drag knob 51. The second rear drag sound generating mechanism 70 includes second sounding recesses 71, a second mounting recess 72, a second sounding pin 73, and a second coil spring 74. The second sounding recesses 71 are formed into groove shapes that extend in the axial direction, and are formed spaced apart in the circumferential direction in the inner peripheral side surface in the forward direction of the second lever member 91 in accordance with the pivot range thereof. The second mounting recess 72 is formed in the outer peripheral side surface of the knob mounting portion 52 such that it is opposite the second sounding recesses 71. An engagement hole 72a is formed in the bottom portion of the second mounting recess 72.

The second sounding pin 73 is mounted in the second mounting recess 72 so as to be able to move in and out therefrom, and engages with the second sounding recesses 71. The second sounding pin 73 includes a second head portion 73a, a second mounting portion 73b that is connected to the second head portion 73a, and a second shaft portion 73c that is connected to the second mounting portion 73b. The second head portion 73a is formed such that the front end thereof is a smooth convex shape. The front end of the second head portion 73a generates a clicking sound by repeatedly striking the second sounding recesses 71. Here, the front end of the second head portion 73a of the second sounding pin 73 is formed in a smooth convex shape, and thus the second sounding pin 73 generates clicking sounds with little resistance. The second mounting portion 73b is formed to have a diameter that is larger than that of the second head portion 73a and smaller than the inner diameter of the second mounting recess 72. The second shaft portion 73c is a shaft shaped component that is formed to have a diameter that is smaller than that of the second mounting portion 73b, and the second coil spring 74 can be disposed around the outer periphery of the second shaft portion 73c. Thus, by forming the second shaft portion 73c to have a diameter that is smaller than that of the second mounting portion 73b, the front end of the second coil spring 74 can be brought into contact with the step portion between the second mounting portion 73b and the second shaft portion 73c. In addition, the second shaft portion 73c is slidably engaged in the axial direction in the engagement hole 72a formed in the second mounting recess 72.

The second coil spring 74 is disposed on the outer periphery of the second shaft portion 73c of the second sounding pin 73. Accordingly, the base end of the second coil spring 74 is brought into contact with the bottom portion of the second mounting recess 72, and the front end of the second coil spring 74 is brought into contact with the step portion between the second mounting portion 73b and the second shaft portion 73c. The second coil spring 74 is accommodated in the second mounting recess 72 in the compressed state, and urges the second sounding pin 73 toward the second sounding recesses 71.

Third Rear Drag Sound Generating Mechanism

The third rear drag sound generating mechanism 80 generates sound when the rear drag mechanism 45 is operated. As shown in FIG. 1 and FIG. 2, the third rear drag sound generating mechanism 80 includes a sounding spring 81, and projections 20c that are formed on the outer peripheral surface of the plate member 20b. The sounding spring 81 is, for example, a plate spring that is formed into an approximate L shape, and is fixedly held at one end thereof to the reel body 1a. The other end of the sounding spring 81 engages with the projection 20c. In this way, when the rear drag mechanism 45 is operated, the spool shaft 14 and the first bush 18 rotate together with the plate member 20b, and the projections 20c of the plate member 20b repeatedly strike the other end of the sounding spring 81 and generate sound.

Operation of the Spinning Reel

When the spinning reel described above is to be used, the bail 43 will be pushed over to the line releasing side when the fishing line is to be reeled out. Then, when the fishing rod is cast, fishing line is reeled out from the spool 3. When the fishing line is to be retrieved, the bail 43 is returned to the line retrieving side. When the handle 10 is rotated in the line winding direction in this state, the rotational force is transmitted to the pinion gear 12 via the handle shaft 10 and the face gear 11. The rotational force transmitted to the pinion gear 12 rotates the rotor 2 on the front portion of the pinion gear 12. In addition, the rotational force transmitted to the pinion gear 12 simultaneously rotates the worm 15 via the intermediate gear (not shown in the figures) that is meshed with the pinion gear 12. When this occurs, the slider 16 that meshes with the spiral grooves of the worm 15 is guided by the guide shaft (not shown in the figures) and moves forward and backward. When the slider 16 moves, the spool shaft 14 and the spool 3 reciprocate forward and backward together with the slider 16. Fishing line that is guided from the bail 43 and the line roller 41 is uniformly wound around the outer periphery of the spool 3 forward and backward due to the rotation of the rotor 2 and the forward and backward movement of the spool 3. When a spinning reel that operates in the above-described manner is used, if a fish is hooked and pulls on the fishing line with a force that exceeds a predetermined drag force, the spool shaft 14 and the spool 3 will rotate relative to each other and the rear drag mechanism 45 will be activated. When this occurs, the projections 20c of the plate member 20b in the third rear drag sound generating mechanism 80 will repeatedly strike the sounding spring 81 and generates sound.

Assembly and Operation of the First Rear Drag Knob

As shown in FIG. 6, in order to assemble the first rear drag knob 50, it will be necessary to mount the first rear drag sound generating mechanism 60 in the second knob member 56 of the first rear drag knob 50. First, the first sounding pin 64 and the first coil spring 65 are disposed in the first mounting recess 63 of the second knob member 56. Then, the sounding member 61 is mounted on the second engagement portion 56f of the second knob member 56 such that the first head portion 64a of the first sounding pin 64 is in contact with a first sounding recess 61b of the sounding member 61. Next, the retaining member 62 is mounted on the fourth annular groove 56b formed in the second knob member 56 to retain the sounding member 61.

After the first rear drag sound generating mechanism 60 is mounted in the second knob member 56, as shown in FIG. 3 and FIG. 4, the ring member 57 is first disposed on the first knob member 55 in order to mount the first rear drag knob 50 on the knob mounting portion 52. Then, the third annular groove 55d of the first knob member 55 is engaged with the first engagement member 58a disposed in the first annular groove 52c of the knob mounting portion 52. Next, the washer 59 is disposed in the rear portion of the third tubular portion 55c of the first knob member 55. When this occurs, the projections 59b of the washer 59 engage with the second engagement recesses 52f from the rear end of the knob mounting portion 52, and the front surface of the circular portion 59a of the washer 59 is brought into contact with the retaining engagement surface 55g of the first knob member 55. Here, the projections 59b of the washer 59 are engaged in the second engagement recesses 52f of the knob mounting portion 52, and thus the rotation of the washer 59 is restricted with respect to the knob mounting portion 52. Next, the second engagement member 58b is brought into contact with the rear surface of the washer 59, and engaged with the second annular groove 52d. Rearward movement of the first knob member 55 can be regulated via the washer 59 by the second engagement member 58b. In addition, even if the first knob member 55 rotates, the rotation of the first knob member 55 will not be transmitted to the second engagement member 58b due to the washer 59 whose rotation is restricted with respect to the knob mounting portion 52. Thus, the second engagement member 58b can be maintained in a stable posture. Finally, the second knob member 56 is connected with the first knob member 55. Therefore, the engagement portions 61c of the sounding member 61 of the first rear drag sound generating mechanism 60 mounted on the second knob member 56 are engaged with the engagement recesses 52b of the knob mounting portion 52 to non-rotatably connect the sounding member 61 to the knob mounting portion 52.

Thus, after the first rear drag sound generating mechanism 60 is mounted on the second knob member 56, by connecting the second knob member 56 to the first knob member 55, it will become easier to mount the second knob member 56 to the first knob member 55, and remove the second knob member 56 from the first knob member 55, together with the first rear drag sound generating mechanism 60. Accordingly, when one attempts to mount the second knob member 56 to the knob mounting portion 52, it will be difficult for the first sounding member 64 and the urging means 65 to fall out from the second knob member 56 regardless of what posture the second knob member 56 is in because the sounding member 61 is mounted to the second knob member 56 with the first sounding pin 64 engaged with the first sounding recess 61b of the sounding member 61, and the sounding member 61 is retained with the retaining member 62. In addition, even if one attempts to take the second knob member 56 off of the knob mounting portion 52, it will be difficult for the first sounding pin 64 and the urging means 65 to fall off of the second knob member 56 because the sounding member 61 retained by the retaining member 62 prevents the removal of the sounding pin 64 and the urging means 65 from the second knob member 56.

When the first rear drag knob 50 mounted on the knob mounting portion 52 as noted above is tightened, the first pressure member 22 inserted into the first engagement portion 56e of the second knob member 56 will rotate while moving forward, and the coil spring 21 connected to the first pressure member 22 will be pushed inward. Then, the pressing force applied to the plurality of friction plates 19a of the first friction engagement portion 19 will greatly increase. When this occurs, both surfaces of the flange portion 23 of the first bush 18 are interposed between the friction plates 19a, and the pressure applied to both surfaces of the flange portion 23 greatly increases. Thus, it will become difficult to rotate the spool shaft 14 that is non-rotatable with respect to the first bush 18, and the drag force applied to the spool 3 will strengthen. On the other hand, when the first rear drag knob 50 is loosened, the first pressure member 22 will rotate while moving rearward, and the compressed state of the coil spring 21 will be gradually released. When this occurs, the pressure on the flange portion 23 interposed between the friction plates 19a will be released. Thus, it will become easier to rotate the spool shaft 14 (that is non-rotatable with respect to the bush 18), and the drag force applied to the spool 3 will weaken.

In addition, when the first rear drag knob 50 is tightened and loosened, the first knob member 55 rotates relative to the knob mounting portion 52 in a state in which the first knob member 55 is not movable in the axial direction. Then, the second knob member 56 non-rotatably connected to the first knob member 55 will rotate relative to the sounding member 61 non-rotatably mounted to the knob mounting portion 52. When this occurs, the first sounding pin 64 disposed in the first mounting recess 63 of the second knob member 56 will be urged by the first coil spring 65, and repeatedly strike the plurality of first sounding recesses 61b formed in the sounding member 61 to generate clicking sounds. Thus, by engaging the first sounding pin 64 that is disposed in the first mounting recess 63 of the second knob member 56 with the plurality of first sounding recesses 61b of the sounding member 61 with the urging force of the first coil spring 65, good crisp clicking sounds can be obtained when the first rear drag knob 50 is rotated. Note that the first rear drag knob 50 is not movable in the axial direction with respect to the knob mounting portion 52, and thus it will be difficult for an uneven surface to be created between the first rear drag knob 50 and the second rear drag knob 51. Thus, the design of the silhouette between the first rear drag knob 50 and the second rear drag knob 51 can be improved.

Assembly and Operation of the Second Rear Drag Knob

As shown in FIG. 8 and FIG. 9, in order to assemble the second rear drag knob 51, it will be necessary to mount the second rear drag sound generating mechanism 70 on the knob mounting portion 52. First, the second sounding pin 73 and the second coil spring 74 are disposed in the second mounting recess 72 formed in the knob mounting portion 52. When this occurs, the second coil spring 74 is disposed around the outer periphery of the second shaft portion 73c of the second sounding pin 73, and the second shaft portion 73c of the second sounding pin 73 engages with the engagement hole 72a formed in the bottom portion of the second mounting recess 72. Then, the second head portion 73a of the second sounding pin 73 will be in a state in which it can be brought into contact with a second sounding recess 71 formed in the second lever member 91.

Thus, as shown in FIG. 5, in order to assemble the second rear drag knob 51 after the second rear drag sound generating mechanism 70 is mounted on the knob mounting portion 52, the second lever member 91 is first accommodated in the inner peripheral portion of the first lever member 90. Then, the positioning pin 92 and the fourth coil spring 93 are placed in the fourth mounting recess 91b of the second lever member 91. The fixing member 94 is fixedly coupled to the second lever member 91 with a bolt so that the positioning pin 92 and the fourth coil spring 93 will not fall out from the fourth mounting recess 91b. Next, the second engagement recesses 91c of the second lever member 91 and the first engagement projections 90b of the first lever member 90 are respectively engaged from the rear with the second engagement projections 95a and the first engagement recesses 95c of the tubular member 95.

In mounting the second rear drag knob 51 assembled as noted above to the knob mounting portion 52, the third male threaded portion 52e formed on the knob mounting portion 52 is screwed together with the third female threaded portion 95e arranged on the inner peripheral surface of the tubular member 95. At this point, the second head portion 73a of the second sounding pin 73 of the second rear drag sound generating mechanism 70 will be brought into contact with a second sounding recess 71 formed in the second lever member 91. Thus, the second rear drag knob 51 is pivotably mounted on the knob mounting portion 52, and the second rear drag sound generating mechanism 70 is disposed between the second rear drag knob 51 and the knob mounting portion 52.

As described above, when the second rear drag knob 51 mounted on the knob mounting portion 52 is tightened, the tubular member 95 screwed onto the knob mounting portion 52 will rotate relative to the first and second lever members 90, 91 and the knob mounting portion 52, and at the same time, will move forward relative to the first and second lever members 90, 91 and the knob mounting portion 52. Then, the second pressing member 25 will press on the second friction engagement portion 20 via the engagement portion 95b. Accordingly, the pressing force applied to the plurality of friction plates 20a of the second friction engagement portion 20 will greatly increase. At this point, both surfaces of the plate member 20b non-rotatably mounted to the outer periphery of the first bush 18 will be interposed by the friction plates 20a, and the pressure applied to both surfaces of the plate member 20b will greatly increase. Thus, it will also become difficult to rotate the spool shaft 14 that is non-rotatable with respect to the first bush 18, and the drag force applied to the spool 3 will strengthen. On the other hand, when the second rear drag knob 51 is loosened, the tubular member 95 will rotate relative to the first and second lever members 90, 91 and the knob mounting portion 52, and at the same time, will move rearward relative to the first and second lever members 90, 91 and the knob mounting portion 52. When this occurs, the pressing state of the second friction engagement portion 20 caused by the second pressing member 25 will be gradually released. Accordingly, the spool shaft 14 (that is non-rotatable with respect to the bush 18) will become easier to rotate, and the drag force of the spool 3 will weaken.

In addition, when the second rear drag knob 51 is tightened and loosened, the second lever member 91 will rotate, together with the first lever portion 90 and the fixing portion 94, relative to the knob mounting portion 52. When this occurs, the second sounding pin 73 disposed in the second mounting recess 72 of the knob mounting portion 52 will be urged by the second coil spring 74, and repeatedly strike the plurality of second sounding recesses 71 formed in the second lever member 91 to generate clicking sounds. Thus, by engaging the second sounding pin 73 disposed in the second mounting recess 72 of the knob mounting portion 52 in the plurality of second sounding recesses 71 formed in the second lever member 91 by means of the urging force of the second coil spring 74, good crisp clicking sounds and a modulated clicking sensation can be obtained when the second rear drag knob 51 is pivoted.

With the second rear drag knob 51 assembled and operated as described above, only the tubular member 95 will move forward and backward relative to the knob mounting portion 52 when the first and second lever members 90, 91 and the fixing member 94 are disposed between the rear portion 1c of the reel body 1a and the first rear drag knob 50. Thus, the second rear drag knob 51 can be smoothly pivoted by simply maintaining a minute gap between the fixing member 94 and the rear portion 1c of the reel body 1a, and between the first lever member 90 and the first rear drag knob 50. In addition, the smaller the gaps become, the more difficult it can be made for foreign material to enter into the reel unit. Then, the design of the silhouette of the rear drag operation structure can be improved.

OTHER EMBODIMENTS

Figure 10:
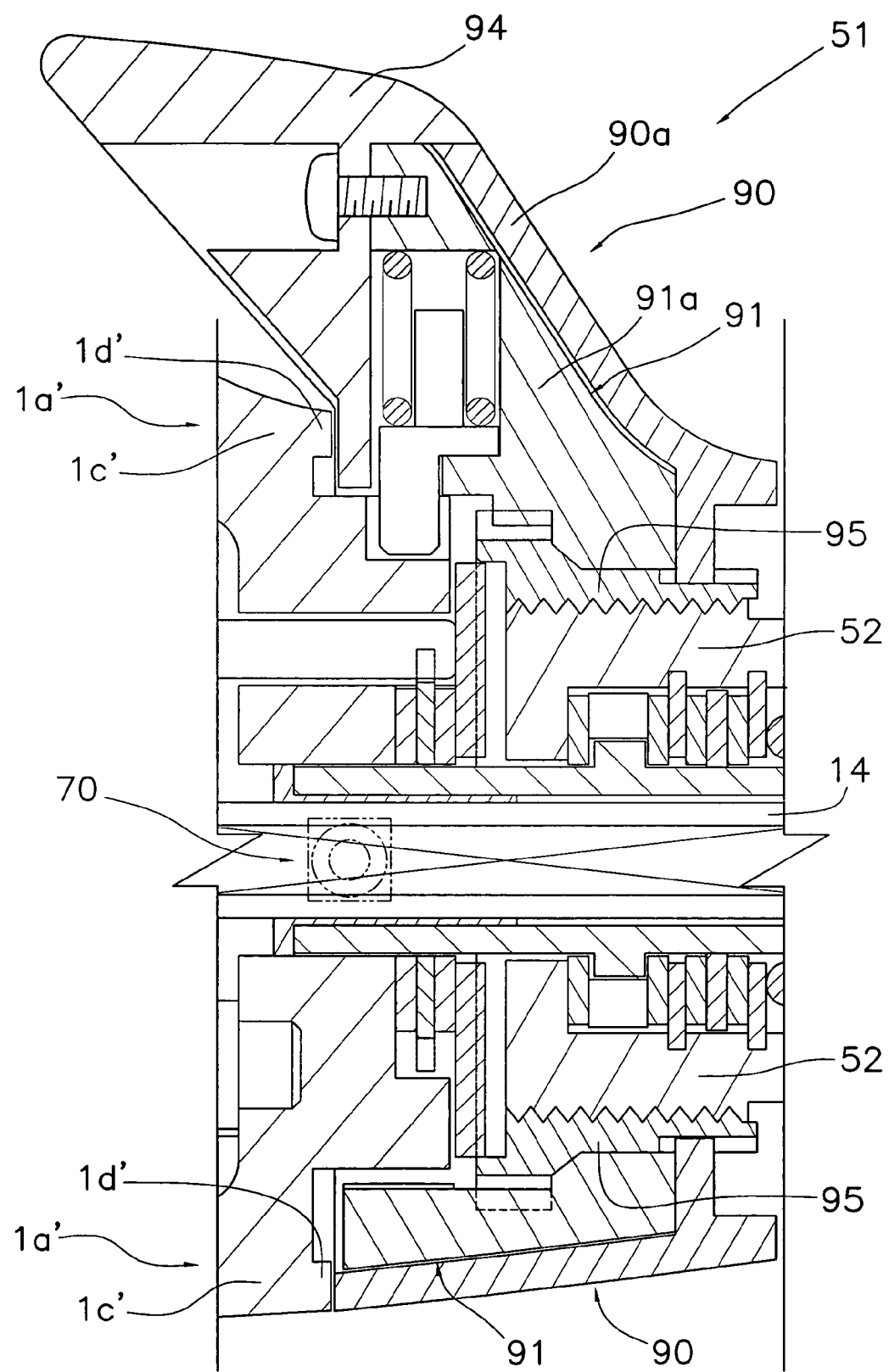
FIG. 10 is an enlarged cross sectional view of a second rear drag knob of a spinning reel according to another embodiment of the present invention.
Figure 11:
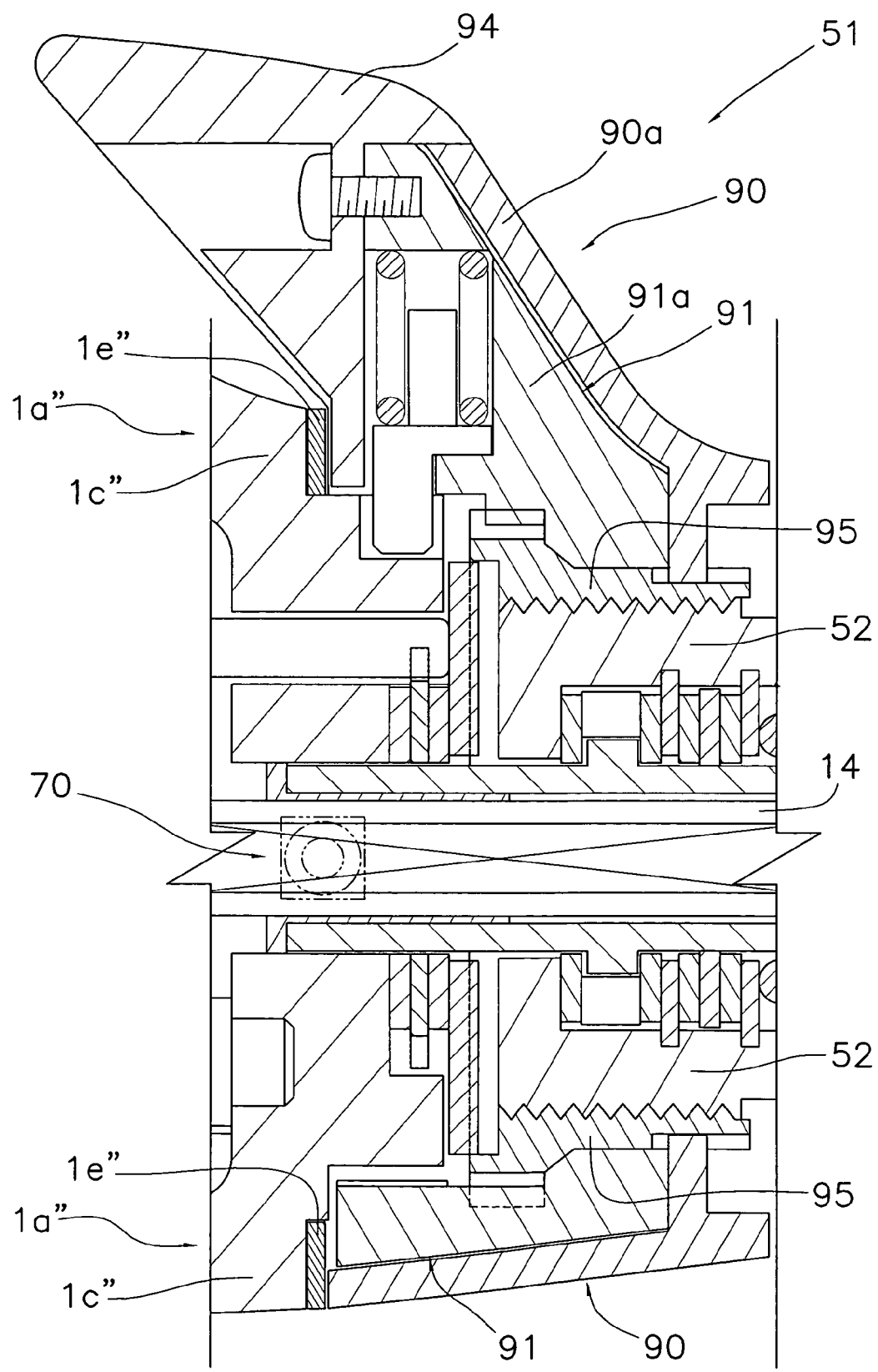
FIG. 11 is an enlarged cross sectional view of a second rear drag knob of the spinning reel according to still another embodiment of the present invention.

Referring now to FIGS. 10–11, a rear drag generating mechanism in accordance with alternative embodiments will now be explained. In view of the similarity between the first and alternative embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity. The parts of the second embodiment that differ from the parts of the first embodiment will be indicated with a prime (') and a double (").

(a) In the aforementioned embodiment, an example was illustrated in which the fixing member 94 of the second rear drag knob 51 was brought near the rear portion 1c of the reel body 1a, and the gap between the front portion of the fixing member 94 and the rear portion 1c of the reel body 1a was made very small. However, the member in which the gap is made very small is not limited to the aforementioned embodiment, and may be embodied in other ways.

For example, as shown in FIG. 10, the gap between the front portion of the fixing member 94 and the rear portion 1c' of the reel body 1a' may be made very small by providing a projection 1d on the rear portion 1c' of the reel unit 1a'. Here, the projection 1d' projects rearward from the rear portion 1c' of the reel body 1a'. The gap between the projection 1d' and the front portion of the fixing portion 94 can be made very small by forming one projection 1d' or a plurality of projections 1d' that are circumferentially spaced apart on the rear portion 1c' of the reel body 1a', or by integrally forming one projection 1d' in an annular shape on the rear portion 1c' of the reel body 1a'.

Figure 12:
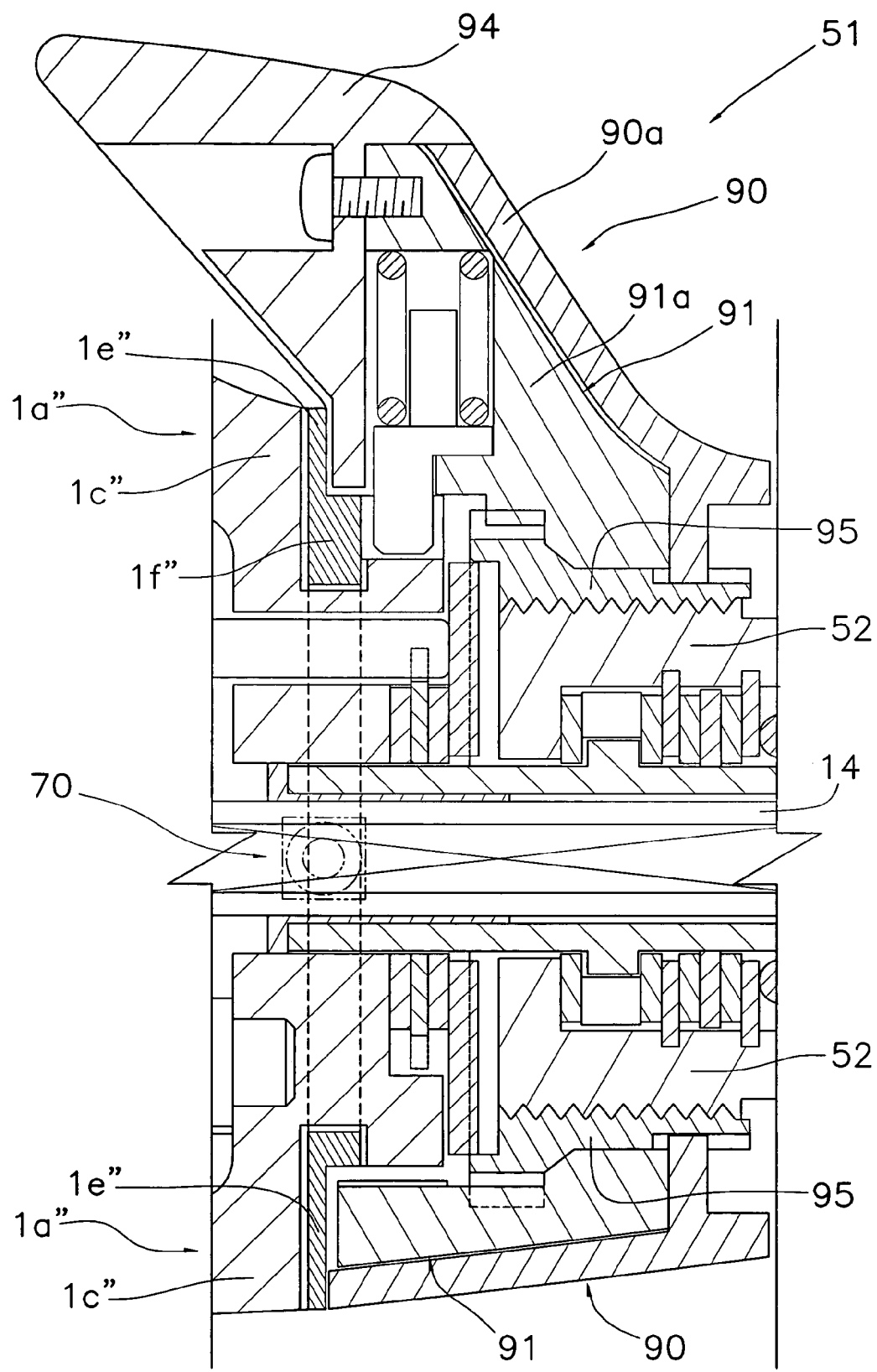
FIG. 12 is an enlarged cross sectional view of a second rear drag knob of the spinning reel according to still another embodiment of the present invention.

In addition, as shown in FIG. 11, when the rear portion 1c" of the reel body 1a" includes a washer 1e", the gap between the front portion of the fixing member 94 and the rear portion 1c" of the reel body 1a" is made very small due to the washer 1e". Furthermore, when a sounding member 1f" is, as seen in FIG. 12, mounted on the rear portion 1c" of the reel body 1a", where the washer 1e" is mounted in FIG. 11, the plurality of second sounding member 71, which is formed in the second lever member 91 in the embodiment of FIG. 9, can be formed on the inner peripheral surface of the sounding member 1f". In this case, as the second rear drag knob 51 rotates, the sound member 1f" also rotates in synchronization with the rotation of the second rear drag knob 51.

(b) In the aforementioned embodiment, an example was illustrated in which a plurality of first engagement recesses 95c and a plurality of second engagement projections 95a are disposed circumferentially spaced apart on the tubular member 95. There is no specific limitation as to the number of first engagement recesses 95c and the second engagement projections 95a disposed on the tubular member 95, and any number of the first and second embodiment recesses may be provided so long as the first and second lever members 90, 91 are positioned on the tubular member 95, and the tubular member 95 can move in a stable manner forward and backward with respect to the first and second lever members 90, 91.

According to the present invention, by contacting the lever member with the front portion of the first rear drag knob and the rear portion of the reel unit, the relative movement of the lever member forward and backward with respect to the knob mounting portion is restricted. In this state, the drag force of the rear drag mechanism can be adjusted by moving the nut member screwed onto the knob mounting portion forward and backward relative to the lever member and the knob mounting portion by pivoting the second rear drag knob. In this way, there will no longer be any need to provide gaps between the second rear drag knob and the rear portion of the reel unit and between the second rear drag knob and the front portion of the first rear drag knob to give a room for the lever member to move. Thus it can be made difficult for foreign matter to enter inside the reel unit. Then, the design of the silhouette of the rear drag operational structure can be improved.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least±5% of the modified term if this deviation would not negate the meaning of the word it modifies.

This application claims priority to Japanese Patent Application No. 2003-282562. The entire disclosure of Japanese Patent Application No. 2003-282562 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rear drag operation structure for a spinning reel that serves to operate a rear drag mechanism arranged on a rear portion of a reel unit, comprising:
    a knob mounting portion including a tubular portion that is adapted to be arranged on a rear of the reel unit so as to project rearward in a tubular shape from the rear portion of the reel unit, and a male threaded portion formed on an outer peripheral surface of the tubular portion;
    a first rear drag knob that is mounted on a rear end portion of the knob mounting portion and which serves to finely adjust a drag force of the rear drag mechanism; and
    a second rear drag knob that includes a lever member and a nut member, the lever member being adapted to be disposed between the rear portion of the reel unit and a front portion of the first rear drag knob so as to be able to be brought to contact with the reel unit and the first rear drag knob, the nut member being mounted on the lever member so as to be non-rotatable but movable forward and backward relative to the lever member, the nut member being screwed onto the male threaded portion of the knob mounting portion, the drag force of the rear drag mechanism being adjusted by pivoting the lever member and thereby rotating the nut member relative to the knob mounting portion.

2. The rear drag operation structure for a spinning reel set forth in claim 1, wherein
    the nut member has at least one first recess that is formed on an outer periphery of a rear end portion of the nut member so as to extend frontward, and
    the lever member includes a tubular lever part and a first projection that is formed on an inner periphery of the tubular lever part so as to engage with the first recess.

3. The rear drag operation structure for a spinning reel set forth in claim 1, wherein
    the nut member has at least one of a second projection and a second recess that is formed on an outer periphery of a front end portion of the nut member so as to extend rearward, and
    the lever member includes a tubular lever part and the other of the second projection and the second recess that is formed on an inner periphery of the tubular lever part so as to engage with the one of the second projection and the second recess.

4. The rear drag operation structure for a spinning reel set forth in claim 1, wherein
    the first rear drag knob is mounted on the knob mounting portion so that the first rear drag knob is rotatable but not movable forward and backward relative to the knob mounting portion, and
    the second rear drag knob is adapted to be disposed such that the second rear drag knob substantially contacts the rear portion of the reel unit and the first rear drag knob.

5. The rear drag operation structure for a spinning reel set forth in claim 1, further comprising
    a sound generating mechanism disposed between the second rear drag knob and the knob mounting portion, the sound generating mechanism generating sound when the second rear drag knob is pivoted in a predetermined pivot range, the sound generating mechanism including a plurality of sounding recesses, a mounting recess, a sounding pin, and an urging member, the plurality of sounding recesses being formed circumferentially spaced apart in an inner periphery of the second rear drag knob in accordance with the predetermined pivot range, the mounting recess being formed in an outer periphery of the knob mounting portion in a position opposite the sounding recess, the sounding pin being mounted in the mounting recess such that the sounding pin engages with the sounding recesses, the urging member being disposed in the mounting recess to urge the sounding pin toward the sounding recesses.

6. The rear drag operation structure for a spinning reel set forth in claim 1, wherein
the knob mounting portion has a female threaded portion formed on an inner peripheral surface of the tubular portion, and
the first rear drag knob includes a pressure member that engages the female threaded portion of the knob mounting portion, such that the pressure member is rotatable and movable forward and backward relative to the knob mounting portion.

7. A spinning reel comprising:
a reel unit that rotatably supports a handle;
a rotor rotatably supported on a front of the reel unit;
a spool mounted on a front of the rotor so as to shift back and forth;
a rear drag arranged on a rear portion of the reel unit to cause a drag force to be applied to the spool; and
a rear drag operation structure including
a knob mounting portion including a tubular portion that is adapted to be arranged on a rear of the reel unit so as to project rearward in a tubular shape from the rear portion of the reel unit, and a male threaded portion formed on an outer peripheral surface of the tubular portion;
a first rear drag knob that is mounted on a rear end portion of the knob mounting portion and which serves to finely adjust a drag force of the rear drag mechanism; and
a second rear drag knob that includes a lever member and a nut member, the lever member being adapted to be disposed between the rear portion of the reel unit and a front portion of the first rear drag knob so as to be able to be brought to contact with the reel unit and the first rear drag knob, the nut member being mounted on the lever member so as to be non-rotatable but movable forward and backward relative to the lever member, the nut member being screwed onto the male threaded portion of the knob mounting portion, the drag force of the rear drag mechanism being adjusted by pivoting the lever member and thereby rotating the nut member relative to the knob mounting portion.

8. The spinning reel set forth in claim 7, wherein
the nut member has at least one first recess that is formed on an outer periphery of a rear end portion of the nut member so as to extend frontward, and
the lever member includes a tubular lever part and a first projection that is formed on an inner periphery of the tubular lever part so as to engage with the first recess.

9. The spinning reel set forth in claim 7, wherein
the nut member has at least one of a second projection and a second recess that is formed on an outer periphery of a front end portion of the nut member so as to extend rearward, and
the lever member includes a tubular lever part and the other of the second projection and the second recess that is formed on an inner periphery of the tubular lever part so as to engage with the one of the second projection and the second recess.

10. The spinning reel set forth in claim 7, wherein
the first rear drag knob is mounted on the knob mounting portion so that the first rear drag knob is rotatable but not movable forward and backward relative to the knob mounting portion, and
the second rear drag knob is adapted to be disposed such that the second rear drag knob substantially contacts the rear portion of the reel unit and the first rear drag knob.

11. The spinning reel set forth in claim 7, wherein
the rear drag operation structure further includes a sound generating mechanism disposed between the second rear drag knob and the knob mounting portion, the sound generating mechanism generating sound when the second rear drag knob is pivoted in a predetermined pivot range, the sound generating mechanism including a plurality of sounding recesses, a mounting recess, a sounding pin, and an urging member, the plurality of sounding recesses being formed circumferentially spaced apart in an inner periphery of the second rear drag knob in accordance with the predetermined pivot range, the mounting recess being formed in an outer periphery of the knob mounting portion in a position opposite the sounding recess, the sounding pin being mounted in the mounting recess such that the sounding pin engages with the sounding recesses, the urging member being disposed in the mounting recess to urge the sounding pin toward the sounding recesses.

12. The spinning reel set forth in claim 7, wherein
the knob mounting portion has a female threaded portion formed on an inner peripheral surface of the tubular portion, and
the first rear drag knob includes a pressure member that engages the female threaded portion of the knob mounting portion, such that the pressure member is rotatable and movable forward and backward relative to the knob mounting portion.

13. The spinning reel set forth in claim 7, wherein
the reel unit has a rearward projection on its rear portion, and
the second rear drag knob is adapted to be disposed such that the second rear drag knob substantially contacts the rearward projection on the rear portion of the reel unit and the first rear drag knob.

14. The spinning reel set forth in claim 7, wherein
the reel unit has a washer disposed on its rear portion, and
the second rear drag knob is adapted to be disposed such that the second rear drag knob substantially contacts the washer on the rear portion of the reel unit and the first rear drag knob.

* * * * *